(12) United States Patent
Wright

(10) Patent No.: US 8,400,328 B2
(45) Date of Patent: Mar. 19, 2013

(54) BRAKE WARNING DEVICE

(76) Inventor: Martin John Wright, Wanganui (NZ)

(*) Notice: Subject to any disclaimer, the term of this patent is extended or adjusted under 35 U.S.C. 154(b) by 750 days.

(21) Appl. No.: 11/909,536

(22) PCT Filed: Mar. 24, 2006

(86) PCT No.: PCT/NZ2006/000050
§ 371 (c)(1),
(2), (4) Date: Jan. 28, 2008

(87) PCT Pub. No.: WO2006/101408
PCT Pub. Date: Sep. 28, 2006

(65) Prior Publication Data
US 2010/0156619 A1    Jun. 24, 2010

(30) Foreign Application Priority Data
Mar. 24, 2005  (NZ) ......................................... 535528

(51) Int. Cl.
*G08G 1/95* (2006.01)
(52) U.S. Cl. ........................................ 340/908; 340/454
(58) Field of Classification Search .................. 340/908, 340/454, 451, 9.63; 303/3, 9.63, 9.6
See application file for complete search history.

(56) References Cited

U.S. PATENT DOCUMENTS

| | | | |
|---|---|---|---|
| 3,374,322 A | | 3/1968 | Miller |
| 3,712,683 A | * | 1/1973 | Keady et al. ............... 303/9.63 |
| 3,772,672 A | | 11/1973 | Adahan |
| 3,985,986 A | | 10/1976 | Doerfler |
| 5,572,187 A | * | 11/1996 | Williford ...................... 340/454 |
| 2002/0195870 A1 | * | 12/2002 | Brunson et al. ................. 303/7 |

FOREIGN PATENT DOCUMENTS

| | | |
|---|---|---|
| CH | 625 343 | 9/1981 |
| CN | 625343 | 9/1981 |
| GB | 619 099 | 11/1946 |

* cited by examiner

*Primary Examiner* — Shirley Lu
(74) *Attorney, Agent, or Firm* — James Creighton Wray

(57) ABSTRACT

A device and method for providing a warning to an operator of a truck/tractor and trailer unit of a potential loss or reduction of brakes. The invention provides a pressure differential sensor (12) which bridges between an air supply line (13, 16) to the spring brakes (17) of a truck/tractor and an air supply line (14) to the trailer. An audible and/or visual warning device (31, 33) coupled to the sensor (12) is activated upon a differential between the pressures in the respective supply lines (13, 16 and 14) being sensed.

13 Claims, 6 Drawing Sheets

BRAKE WARNING DEVICE

BACKGROUND OF THE INVENTION

This invention relates to a brake warning device.

The present invention has particular utility in the heavy truck and trailer industry as it has application to the dual air brake systems of truck/tractor and trailer units, with the intention of providing a warning of possible air brake system failure or malfunction. It is particularly, but not exclusively, intended to provide a warning of potential failure arising out of incorrect operation of the in-cab brake valves, which can potentially result in no service brake pressure to the trailer, therefore, leading to the potential for a serious crash situation. The warning device, however, can also provide warning of no, or lowered, service brake pressure arising out of other failure defective or defect situations.

A situation which can occur, even with an experienced operator, and the tractor/trailer braking system complying with land transport safety standards, and being well maintained, arises out of incorrect operation of the in-cab valves for actuating and releasing the tractor and trailer spring brakes. In a parked situation, the tractor and trailer brake valves will be in the 'out' position, which corresponds with the tractor and trailer spring brakes being applied.

Still in the parked position, the operator may push 'in' the yardvalve for the trailer in order to release the trailer brakes. Subsequently, the operator gets into the cab and accidentally pushes 'in', only the tractor brake valve. The tractor and trailer unit can then be driven away as all of the spring brakes are off as per normal. However, the trailer brake valve is in the 'out' position and, as a consequence, there will be no air pressure in the trailer brake supply line. Furthermore, the tractor protection system will work correctly and, thus, the trailer will receive no service brake pressure and, effectively, the trailer will have no brakes.

A possible outcome of such a situation is that the operator may feel a lack of brake efficiency and will push 'in' the trailer brake valve so that the system is restored to normal. Less likely, but nevertheless very possible, is that the operator needs maximum brake balance upon first application of the brakes, and in the absence of such balance, loses control of the tractor/trailer unit. This loss of control can result in a crash situation.

In a serious crash, the problem which led to the crash may be difficult to detect due to no actual defects being detectable, especially as all of the valves return to the 'out' position upon loss of air pressure. The chances of misdiagnosis and, therefore, a reoccurrence of accidents for the same reason is very high.

SUMMARY OF THE INVENTION

It is, therefore, an object of the present invention to provide a brake warning device, which can be incorporated into the air brake system of a truck/tractor and trailer unit, to provide a warning of a potential loss of service brake pressure to the brakes of the trailer.

In its simplest form the invention broadly is a brake warning device arranged to compare unregulated truck/tractor spring brake hold off pressure to the pressure in the trailer park/supply line, information can then be conveyed to a vehicle operator to alert the operator to a pressure difference.

Broadly according to one aspect of the invention there is thus provided a brake warning device including a pressure differential sensor adapted for bridging between air supply lines in a truck/tractor and trailer unit dual circuit braking system, and an electrically operable warning device coupled to the pressure differential sensor, the pressure differential sensor having an element operable in response to a pressure differential being detected between the air supply lines and arranged to cause the electrical circuit of the warning device to be completed to thereby activate the warning device.

In one form of the invention the sensor can include a movable element which is movable in response to different pressures acting on the movable element. The movable element can be located in a chamber to which pressure lines coupled to the said air supply lines are connected, the movable element having applied to opposite sides thereof pressure from a pressure line, whereby the movable element will move in response to an imbalance between the applied pressures.

According to one form the movable element can be a piston slidingly located in the chamber.

According to a preferred form of the invention, the pressure differential sensing device incorporates a diaphragm. In a preferred arrangement, the electrical circuit includes contacts within spaces either side of the diaphragm and respective of the contacts being contactable by the diaphragm in response to different pressures existing in said spaces.

Preferably the diaphragm is made from, or includes, electrically conductive material which is connected into the circuit.

In a preferred form of the invention the warning device is an audible and/or visual warning device. The audible warning device can be a buzzer, siren or the like.

According to a second broad aspect of the invention there is provided a method of detecting a failure or fault condition in an air brake system of a truck/tractor and trailer the method including sensing an unregulated truck/tractor brake hold off pressure, sensing the pressure in a trailer park/supply line, comparing the sensed pressures and causing a warning signal in response to an imbalance between the pressures sufficient to indicate a potential loss of service brake pressure.

Preferably the signal is used to activate or operate a pressure balance indicator gauge.

Preferably the signal is used to trigger a visual and/or audible alarm.

BRIEF DESCRIPTION OF THE DRAWINGS

In the following more detailed description of the invention according to one preferred embodiment, reference will be made to the accompanying drawings in which:—

DESCRIPTION OF PREFERRED EMBODIMENTS OF THE INVENTION

Figure 1:
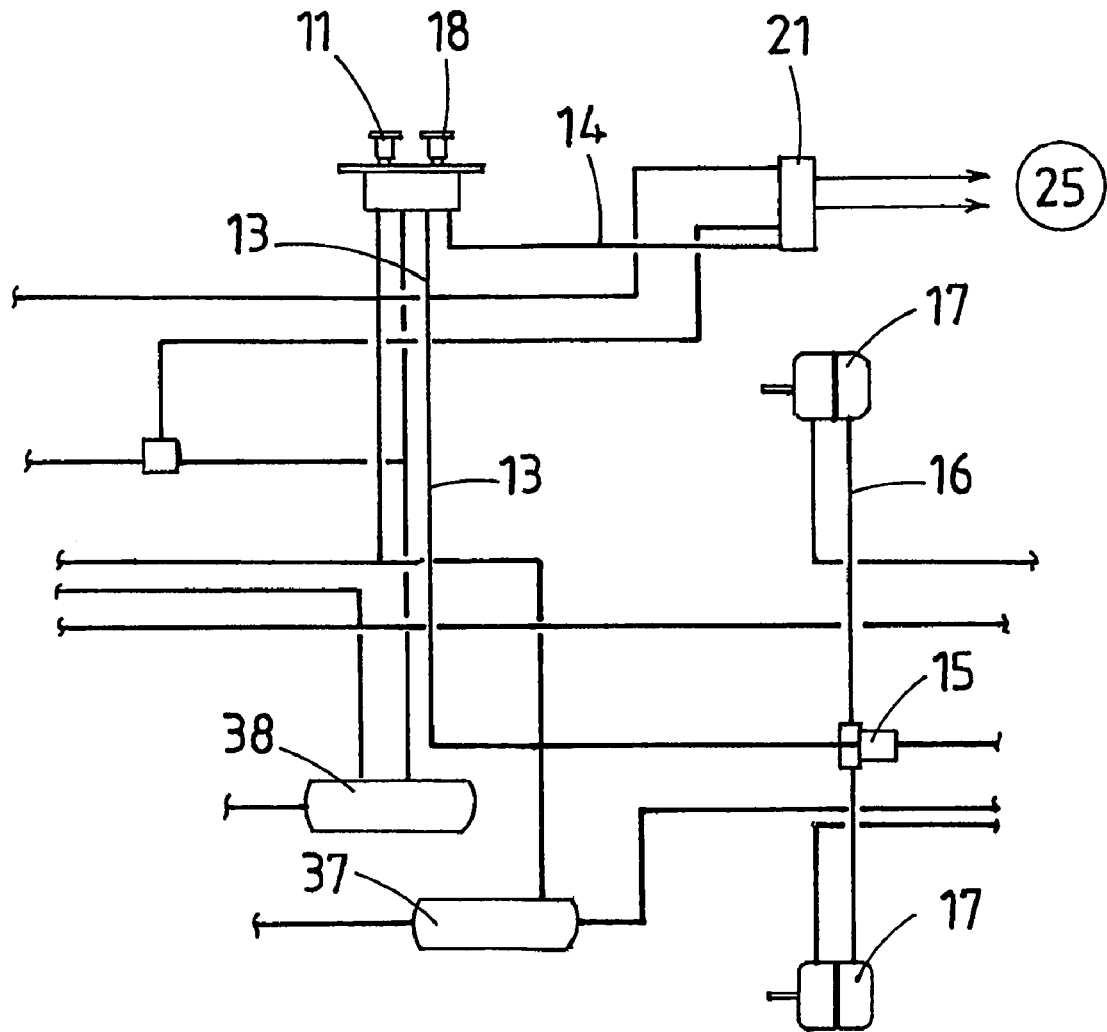
FIG. 1 is a schematic illustration of part of a typical prior art air brake system for a truck/tractor and trailer unit.

Referring firstly to FIG. 1, there is shown part of an air brake system typically used in a truck/tractor and trailer unit.

The particular components and workings of the full air brake system will not be described herein as such is well known to those skilled in the art. The present description will be confined to those elements of the air brake system, which are relevant to the present invention.

According to the system, as shown in FIG. 1, the system incorporates an in-cab brake valve 11, which when activated (i.e. the operator knob pulled out), cuts off the air supply via a brake relay valve 15 to the air operated spring brakes 17, thereby causing the brakes to be applied. in a similar manner the in-cab control valve 18, when operated causes, via a brake relay valve, the spring park brakes 25 of the trailer to be applied.

Figure 2:
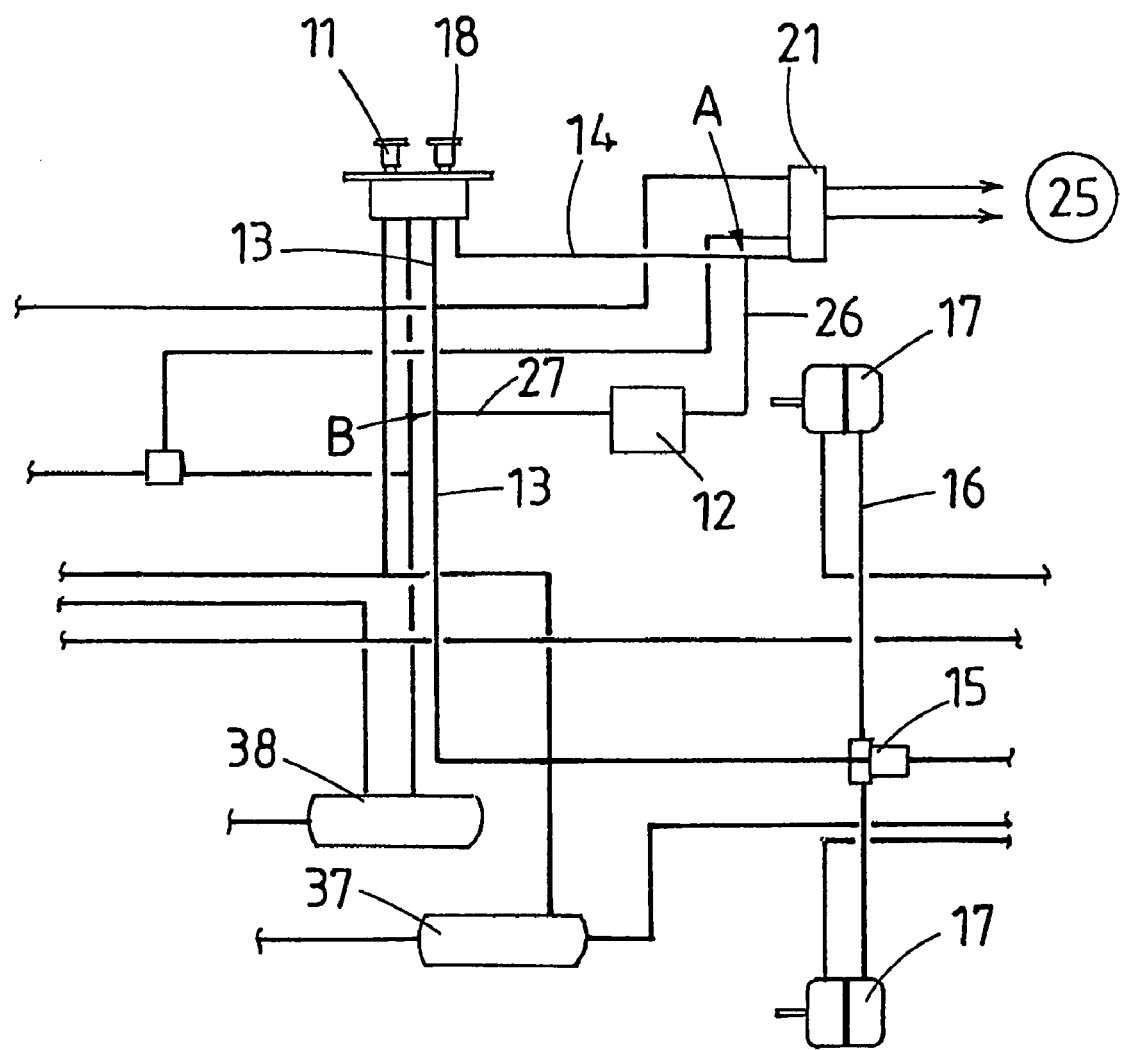
FIG. 2 is the schematic illustration of FIG. 1 but incorporating a first embodiment of the present invention.

According to a first embodiment of the present invention, the pressure differential sensor or switch 12 of the invention is adapted for connection into the pressurised air lines of the air brake system of a truck/tractor and trailer unit. As shown in FIG. 2, the pressure differential switch 12 is connected by pressure sense lines so as to bridge between air supply lines 13 and 14. Air supply line 13 extends from the tractor park valve 11 to a relay valve 15, which in turn, is coupled by air lines 16 to the truck/tractor spring brakes 17. Line 14 extends from a trailer supply valve 18, which is coupled by lines (not shown), to either side of the system park valve 11. Line 14 extends to the trailer spring brake valve 21, which dumps air pressure to the trailer and particularly in connection with this invention the trailer spring brakes 25.

Figure 3:
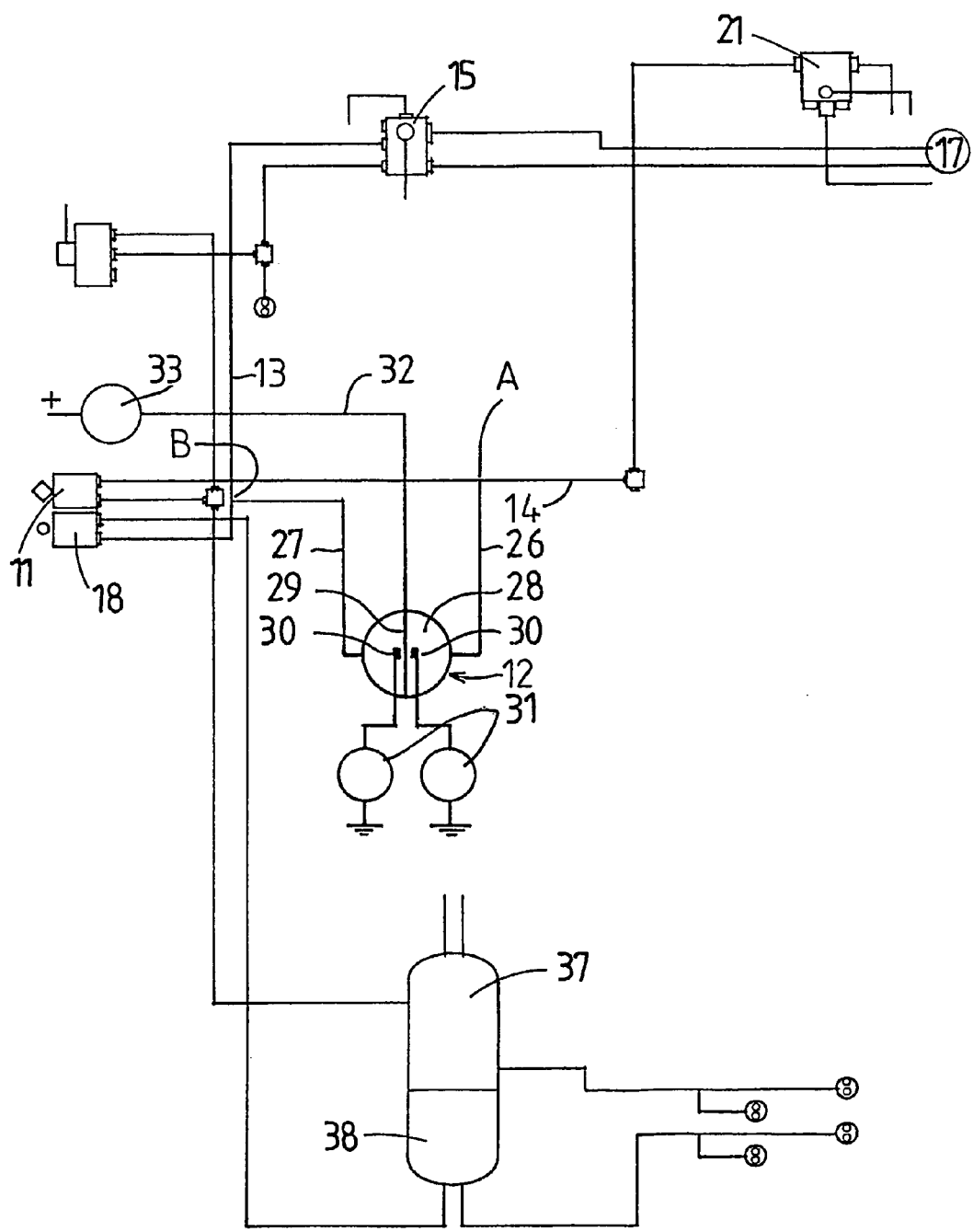
FIG. 3 is a more detailed illustration of components of the air brake system when incorporating the brake warning device according to the first embodiment invention, and particularly an embodiment of a pressure sensor suitable for use in the invention.

Referring now to FIG. 3, the pressure differential sensor 12 is in the form of a switch shown coupled via pressure sense lines 26 and 27 to supply lines 14 and 13 respectively, at points A and B as illustrated.

The pressure differential switch 12 can in one embodiment comprise a chamber 28 which is divided by a diaphragm 29. The diaphragm 29 is moveable in response to pressure differentials within chamber 28 either side of the diaphragm 29, the different pressures being established in response to pressure differentials between lines 13 and 14. Thus, with the system working correctly, the pressure in lines 13 and 14 will be the same, or substantially the same, such that there will be no movement of the diaphragm 28, or insufficient movement to trigger the warning device.

It will be appreciated by the skilled person that the sensor can take other forms whereby a moveable element in a chamber can have pressure applied to opposite sides thereof (from pressure sense lines 26 and 27) so as to move in response to a pressure differential occurring. This movement can then be sensor so as to create a signal which can be used to activate, operate or trigger a gauge and/or a visual and/or audible alarm.

In one embodiment the pressure sensor can have a movable element in the form of a piston. However, irrespective of whether a piston, diaphragm or other movable element is employed the intent is to simply sense a pressure difference between the supply lines and use this to identify visually and/or audibly a fault, malfunction or defect situation.

It will be apparent to the skilled addressee that the electrical systems of modern truck/tractor units use a negative (polarity) earthing system.

Contacts 30 (which are preferably adjustable) are provided within chamber 28 either side of the diaphragm 29. These contacts 30 are connected through a warning light or lights 31 to the trucks earth. The diaphragm 29 can be made of electrically conductive material, or can incorporate electrically conductive material, so that the diaphragm 29, when moved into contact with one of the contacts 30, establishes a circuit between earth and the positive terminal (+) of the truck/tractors power supply via conductor 32.

Conductor 32, can be connected to a warning device 33, which in the preferred form of the invention, is a buzzer 33 or some other form of audible warning device. The warning device 33 can, however, be in a visual warning device or in yet a further and preferred embodiment of the invention there can be both audible and visual warning devices.

When the warning device is installed it is necessary to find the average electrical switch set points and the pressure range for the warning device.

A person skilled in the art, who has thoroughly checked the trucks air brake system using manufactures recommended procedures, will use air pressure gauges of known accuracy to find the average switch set points and bi-directional pressure range for the warning device by following the procedure.

With the trucks engine running at 1500 rpm, or close to normal operating revs for that engine, and the air compressor charging the air supply tanks to within 90 to 100% of the recommended governor cut out, the person will create a 25% difference in air pressure between the trucks air supply tanks and the pressure in the trailer supply line. For example (120 psi at truck tanks) and (90 psi in the trailer supply line). This is achieved using an air pressure gauge of known accuracy between the trailer air supply coupling upstream of a variable tap. The gauge must be arranged or fitted into position ensuring that it is not adversely affected by air flowing past the sensing point.

Figure 6:
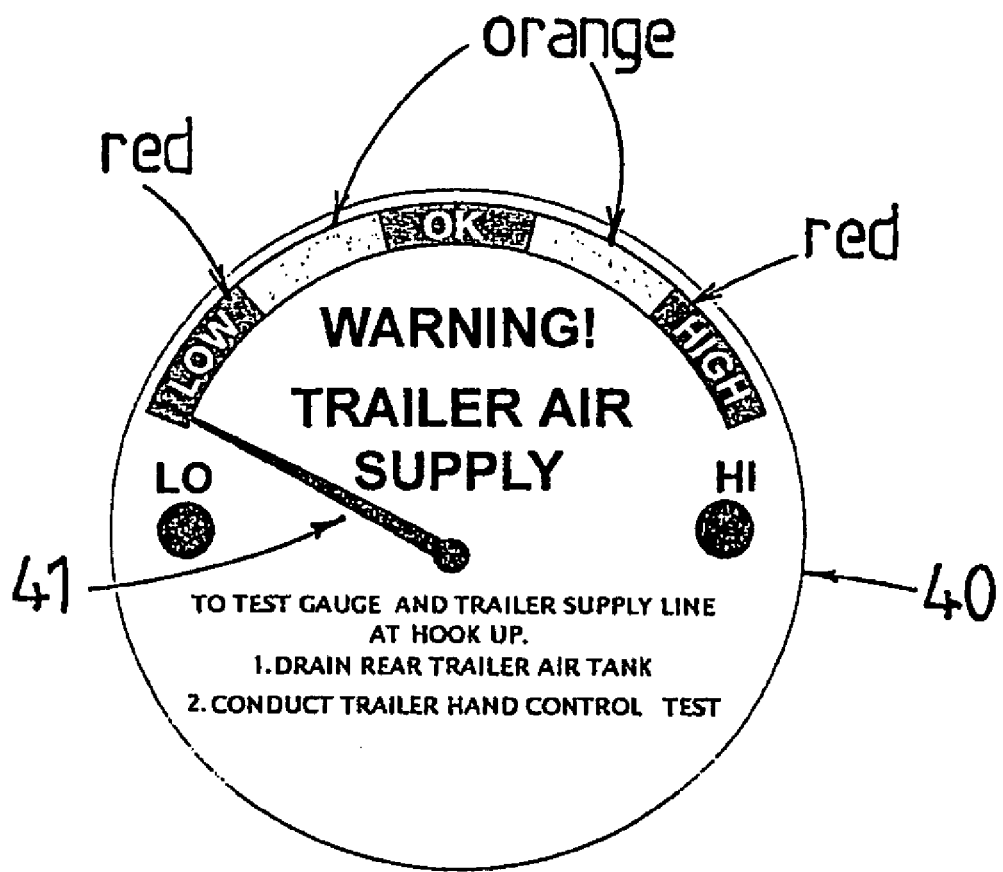
FIG. 6 is a face view of a gauge which forms part of a visual warning output to a vehicle operator.

Using the tap to create a simulated air leak downstream of the trailer coupling point and upstream of the gauge, the person then notes the pressure difference at the connection points of the warning device. For example, if the trucks air compressor is charging the air tanks and they are at 120 psi, the person using the tap opens the tap until the air pressure gauge in the trucks trailer supply line upstream of the tap reads 90 psi. Then using a bi-directional pressure differential gauge of known accuracy, and a double check valve, the pressure difference at the warning device connection points is noted. For example, if the pressure differential gauge reads 15 pounds per square inch difference (psid) the range for the warning device will be −30 psid to 0.0 to +30 psid with the average set points for the electrical switches being −15 psid and +15 psid. These switching points will be in the centre of the orange zone of the trailer air monitor gauge 40 (FIG. 6).

Figure 4:
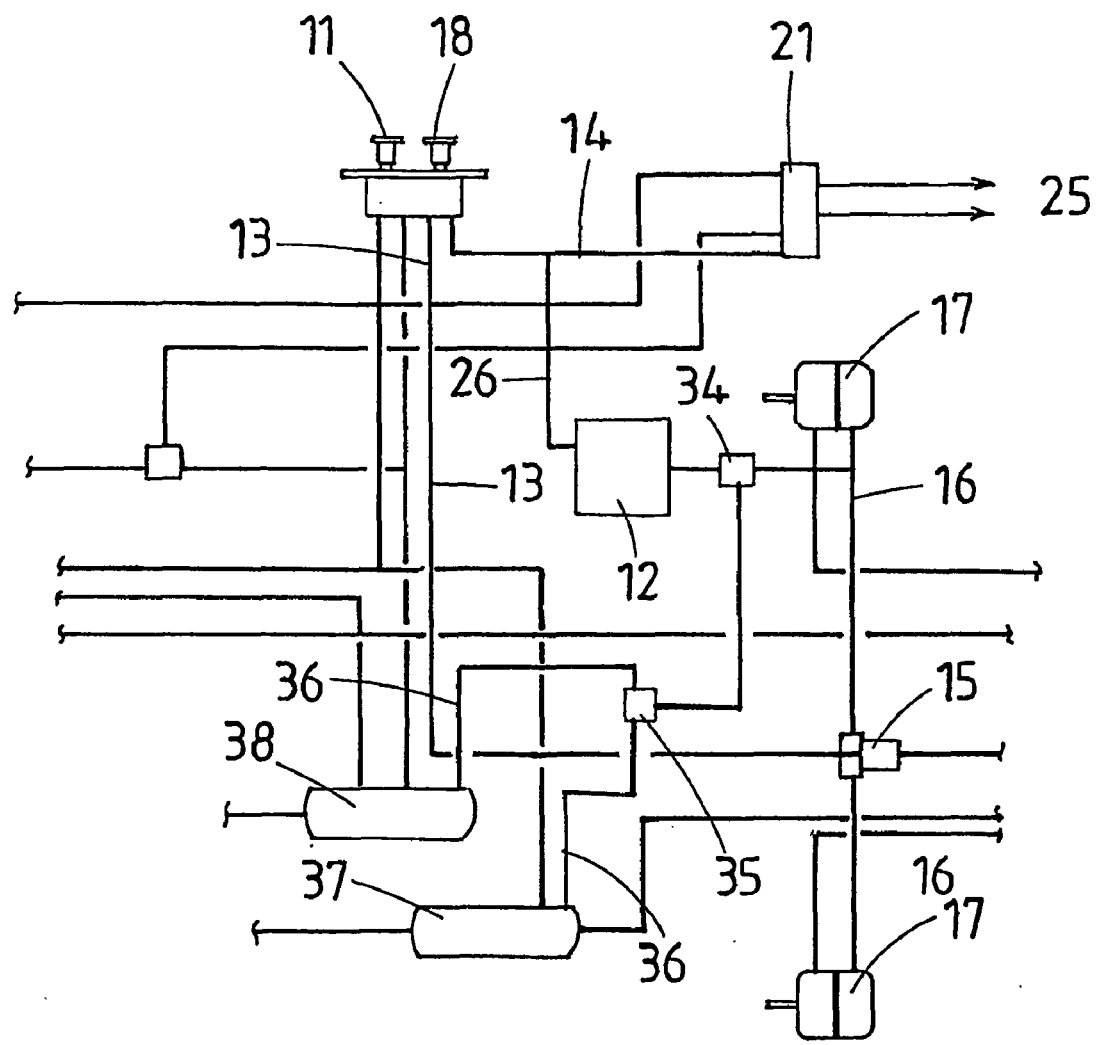
FIG. 4 is a schematic illustration of the invention in a second embodiment when incorporated in the vehicle air brake system as shown in FIG. 1.
Figure 5:
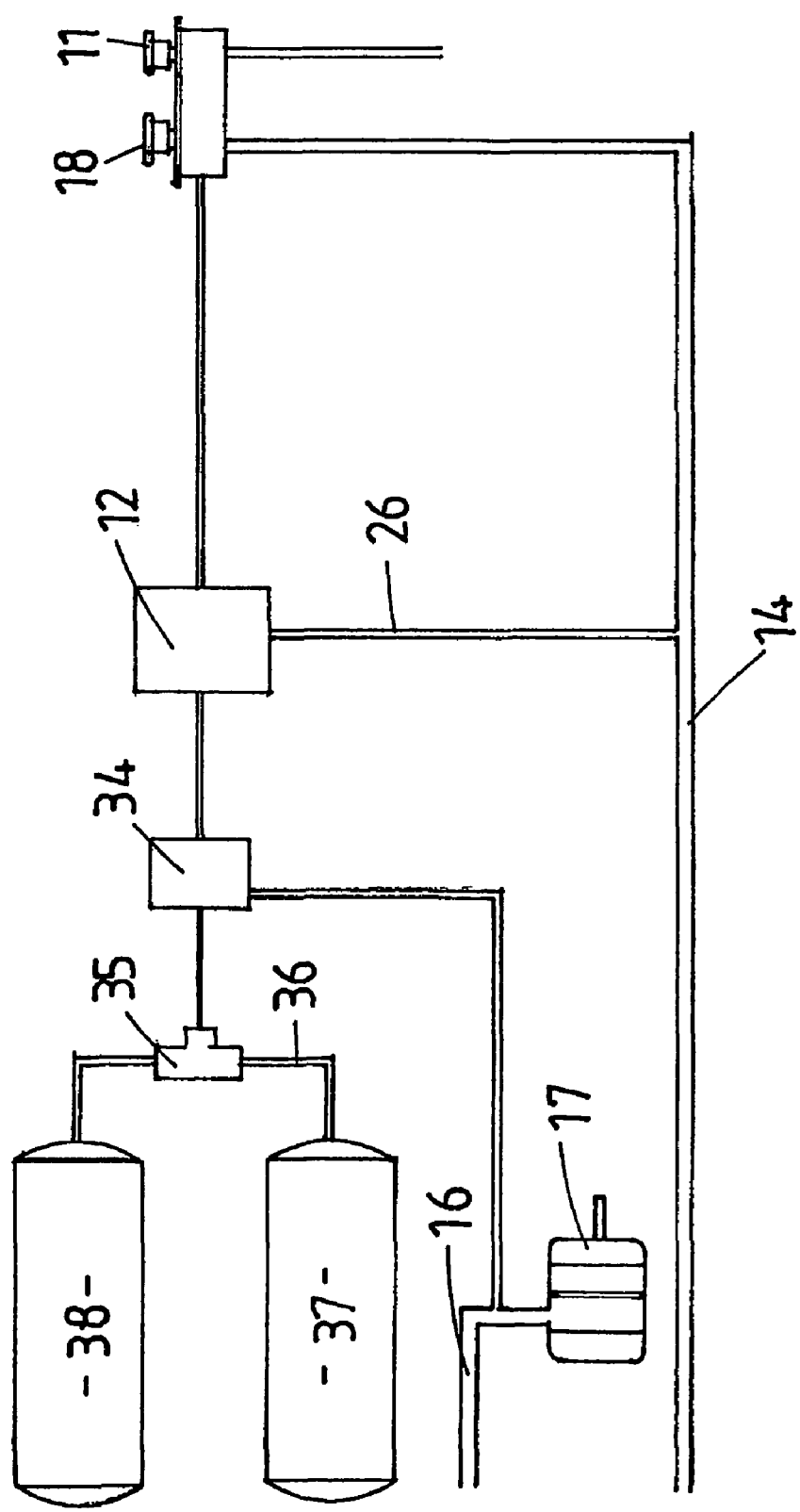
FIG. 5 is a more detailed illustration of the key components of the second embodiment.

The warning device can be connected to the trucks airlines without the relays shown in FIGS. 4 and 5. Alternately, it can be fitted to the truck/tractor spring brake control line immediately down stream of the in-cab valves as shown in FIGS. 2 and 3.

In operation, the brake warning device 33, according to the present invention, will sense differences between the air pressure in lines 13 and 14. Thus, for example, in the specific situation referred to in the preamble of this specification, the non-activation of the in-cab brake valve 11 will create a difference in the pressure between lines 13 and 14, which will immediately result in the diaphragm 29 moving into contact with the relevant contact 30. This will complete the electrical circuit resulting in the warning devices 31/33 changing state to create a visual/audible indication to the vehicle operator.

Furthermore, if during operation a pressure differential occurs between lines 13 and 14, due to, say, a leak causing a pressure drop off in the trailer air supply line, there will, once again, be a pressure differential that will cause the diaphragm 29 to move, and thereby complete the electrical circuit. Once again an audible and/or visual alert will be apparent to the vehicle operator.

The visual alert, in a preferred form, will be a gauge 40 (see FIG. 6) which will be positioned to be in full view to the vehicle operator.

Consequently, the device, according to the present invention, not only provides a warning in the event that correct individual operation of the in-cab valves does not take place, but will also provide an audible warning in the event that a fault develops in the truck/tractor and trailer brake system which may lead to failure of the trailer or tractor brakes.

The warning device of the invention is thus a differential air pressure sensing device. It is bi-directional and can thus have a centre zero gauge with two adjustable electrical switches one on each side of the centre zero and adjustable pressure ranges. The working pressure range is in excess of the maximum pressures typically found in the heavy trucking industry as is the electrical capabilities of the warning lights and audible alarms.

The warning is coupled into the air braking system of the truck/tractor using measured air flow restrictions so as not to adversely affect the braking system due to catastrophic failure of the device. This is done in a similar manner to existing low air pressure warning devices. Restrictions in the signal lines 26, 27 to the sensor 12 are also useful to manage undesirable momentary pressure spikes and aid in the devices ability to self check.

The warning device of the present invention is provided in a low cost, yet effective manner, and in a manner which can readily be installed into existing air brake systems.

Adding the warning device is simple in comparison to explaining to drivers the exceptionally confusing system of valves and ideas (fully manual valves, automatic valves, service brake application valves, yard release valves and the corresponding labels which are often confusing and difficult to read). This has been demonstrated by the use of different coloured knobs, safety latches, covers and also a large amount of poor training literature.

It is believed that the brake warning device of the present invention will have significant advantages including:—
Eliminate crashes due to accidental driver error.
Stop accidental misuse of parking system.
Simplicity.
Early warning of major air leak(s).
Retains the integrity and flexibility of existing air brake systems.
Early warning of activation of emergency systems within the braking system.
Reduced clutch and drive train wear (which can occur by an operator endeavouring to drive off with the trailer brakes engaged).
Warning of internal valve leakage.
Easily tested for correct operation.
Easily understood by drivers and mechanics In addition to drive error in operating the in cab park valves the present invention will be able to alert a vehicle operator to other fault/malfunction situations. These include:—
Substantial air leak from the trailer spring brake hold off system while driving.

The warning device will pick this up immediately and the pointer 41 of gauge 40 will move to the left towards the red zone. This will be in excess of normal triggering a PSID (pounds per square inch difference) triggering a visual and or audible alarm to warn the operator.

Substantial air leak from the trailer service brake system while driving.

The warning device will pick this up and the pointer 41 will move to the left towards the red zone. This will be in excess of normal PSID triggering a visual and or audible alarm to warn the operator.

Significant leak from the trailer air tanks check valve. The warning device will read a high PSID the pointer 41 will be to the right towards the red zone.

Early warning of activation of the emergency systems.

If there is a problem in a trailer air brake system and a larger than normal amount of air is moving to the trailer, the warning device will warn the driver so that he/she is able to avoid a difficult situation.

Stop accidental misuse of the automatic parking system.

If the in cab automatic trailer parking should fail the device will warn the driver. This can prevent a costly roll away situation. This also means the truck can be safely operated even with the intermittent defect because the operator can manually correct the problem eliminating the need for costly trouble shooting and unscheduled maintenance.

Early warning of major air leak.

The device will warn the driver of a major air leak in the trailer well before the existing trucks low air buzzer. Also, well before the emergency system activates the trailer spring brakes and causes an unsafe situation.

Reduced clutch and drive train wear.

Warns the driver not to attempt drive away with the trailer spring brakes on or partially on due to low trailer air. This problem is currently not identified by existing warning devices.

Self-checking ability.

Because of normally occurring pressure differences during a normal days activities such as releasing or applying the system park brake or hooking up to a trailer that is low n air the warning device is largely self-checking.

Warning of internal valve leakage.

Air leaking into the trailer supply line in the system park mode will be detected and the driver will be warned. Also, an intermittent internal leak in the service side of the tractor protection system will not be dangerous if the driver has been warned to activate the trailer supply valve and therefore opening it completely.

It is envisaged that, in operation, an operator will not operate the in-cab valves 11 and 18 simultaneously. One valve will, most probably, be operated before the other. While this will cause the buzzer to sound or light to illuminate, this is not seen as a disadvantage as it effectively provides a "self-check" system whereby the sounding of the buzzer or illumination of the light alerts the operator to the fact that the brake warning device is operating correctly.

One modified form of the invention is the second embodiment as shown in FIG. 4. According to this form of the invention the sensor 12 is, once again, connected via line 26 to air supply line 14. However, the sensor 12 is not coupled to air supply line 13 but is coupled to one of the supply lines 16 between the valve 15 and spring brake 17. This connection, however, is via a relay valve 34.

The relay valve 34 is in turn connected to a double check valve 35 which is located in a line 36 connecting the primary tank 37 to the secondary tank 38 of the air supply circuit of the truck/tractor.

The relay valve 34 therefore uses a signal from the truck/tractor spring brake line 16 to send a "reading" of the maximum tank pressure to the sensor 12. The sensor 12 then, as previously described, compares this maximum available truck/tractor tank pressure to the pressure in the trailer supply line 14.

This embodiment of the invention is appropriate when the supply line 16 is regulated. By drawing off a signal from the supply line 16 via the relay valve 34, the overall effect is a deregulated air supply from the tanks 37 and 38 applied to the sensor 12. The sensor 12 is thus isolated from any fluctuations in the line 13 which may occur such as a high draw-off of air in the event that the trailer has or develops a substantial leak.

This and other modifications to the present invention, but within the scope of the invention, will be apparent to those skilled in the art. As is apparent from the foregoing, the essential aspect of the invention is the bidirectional pressure differential sensor which measures the difference of pressure between the trailer supply line and the spring brake signal to the truck. In this way pressure differences can be monitored and the operator of the vehicle can be appropriately alerted by a pressure gauge and preferably in conjunction with other visual/audible alarm mechanisms.

The invention claimed is:

1. A brake warning device for a tractor and trailer including:
   a pressure differential sensor;
      a first pressure sense line connecting the pressure differential sensor to a first air supply line in a tractor spring brake hold off circuit and a second pressure sense line connecting the pressure differential sensor to a trailer air supply line, such that the pressure differential sensor is configured to sense a pressure difference between the first air supply line in the tractor spring brake hold off circuit and the trailer air supply line; and
      a warning alarm device connected to the pressure differential sensor and configured to warn the user in the event of a negative pressure difference being detected that exceeds a negative pressure difference threshold and to warn the user in the event of a positive pressure difference being detected that exceeds a positive pressure difference threshold; and
      a bi-directional pressure differential gauge connected to the pressure differential sensor and configured to indicate to a user a pressure difference between the first air supply line and the trailer air supply line over a range of negative and positive pressure differences; and
      the brake warning device provided in the tractor of the tractor and trailer.

2. A brake warning device as claimed in claim 1 wherein the warning alarm device is selected from a group consisting of audible alarm devices, visual alarm devices and combinations thereof.

3. A brake warning device as claimed in claim 2 wherein the audible warning device is selected from a group consisting of buzzers, sirens, and combinations thereof.

4. A brake warning device as claimed in claim 1 wherein the warning alarm device is an electrically operable warning alarm device.

5. A brake warning device as claimed in claim 4 wherein the pressure differential sensor has an element operable in response to a pressure difference between the first air supply line and the trailer air supply line and arranged to cause an electrical circuit of the warning alarm device to be completed to thereby activate the warning alarm device.

6. A brake warning device as claimed in claim 5 wherein the element is movable in response to different pressures acting on two different surfaces of the element.

7. A brake warning device as claimed in claim 6 wherein the element is located in a chamber to which the first and second pressure sense lines are connected, the element having applied to a first side thereof pressure from the first pressure sense line and to an opposite side thereof pressure from the second pressure sense line, whereby the element will move in response to an imbalance between the applied pressures.

8. A brake warning device as claimed in claim 6 wherein the element is a piston slidingly located in the chamber.

9. A brake warning device as claimed in claim 6 wherein the element is in the form of a diaphragm.

10. A brake warning device as claimed in claim 9 wherein the electrical circuit includes contacts within spaces either side of the diaphragm and respective of the contacts being contactable by the diaphragm in response to different pressures existing in said spaces.

11. A brake warning device as claimed in claim 10 wherein the diaphragm is made from, or includes, electrically conductive material which is connected in to the circuit.

12. A method of detecting a failure or fault condition in an air brake system of a tractor and trailer the method including:
   using a pressure differential sensor to sense a pressure difference between a first pressure sense line connecting the pressure differential sensor to a first air supply line in a tractor spring brake hold off and a second-pressure sense line connecting the pressure differential sensor to a trailer air supply line; and
   warning the user using a warning alarm device connected to the pressure differential sensor in the event of a negative pressure difference being detected that exceeds a negative pressure difference threshold and in the event of a positive pressure difference being detected that exceeds a positive pressure difference threshold; and
   using a bi-directional pressure differential gauge connected to the pressure differential sensor to display to a user a pressure difference between the first air supply line and the trailer air supply line over a range of negative and positive pressure differences.

13. A brake warning device for a tractor and trailer including:
   a pressure differential sensor;
   a first pressure sense line configured to connect the pressure differential sensor to a first air supply line in a tractor spring brake hold off circuit and a second pressure sense line configured to connect the pressure differential sensor to a trailer air supply line, such that the pressure differential sensor is configured to sense a pressure difference between the first air supply line in the tractor spring brake hold off circuit and the trailer air supply line; and
   a warning alarm device connected to the pressure differential sensor and configured to warn the user in the event of a negative pressure difference being detected that exceeds a negative pressure difference threshold and to warn the user in the event of a positive pressure difference being detected that exceeds a positive pressure difference threshold; and
   a bi-directional pressure differential gauge connected to the pressure differential sensor and configured to indicate to a user a pressure difference between the first air supply line and the trailer air supply line over a range of negative and positive pressure differences; and
      the brake warning device provided in the tractor of the tractor and trailer.

* * * * *